United States Patent
Kuo et al.

(10) Patent No.: US 9,240,163 B2
(45) Date of Patent: Jan. 19, 2016

(54) VIDEO WALL

(71) Applicant: VIA TECHNOLOGIES, INC., New Taipei (TW)

(72) Inventors: Hung-Yi Kuo, New Taipei (TW); Chia-Hung Su, New Taipei (TW)

(73) Assignee: VIA TECHNOLOGIES, INC., New Taipei (TW)

( * ) Notice: Subject to any disclaimer, the term of this patent is extended or adjusted under 35 U.S.C. 154(b) by 290 days.

(21) Appl. No.: 13/933,276

(22) Filed: Jul. 2, 2013

(65) Prior Publication Data

US 2014/0306966 A1    Oct. 16, 2014

(30) Foreign Application Priority Data

Apr. 11, 2013    (TW) .............................. 102112807 A (51) Int. Cl.
*G09G 5/12* (2006.01)
*G06F 3/14* (2006.01)

(52) U.S. Cl.
CPC .............. *G09G 5/12* (2013.01); *G06F 3/1446* (2013.01); *G09G 2300/026* (2013.01); *G09G 2370/022* (2013.01)

(58) Field of Classification Search
None
See application file for complete search history.

(56) References Cited

U.S. PATENT DOCUMENTS

| | | | |
|---|---|---|---|
| 6,897,719 B2 | 5/2005 | Kargl et al. | |
| 7,782,314 B2 | 8/2010 | Niiyama | |
| 7,808,447 B1* | 10/2010 | Cook | 345/1.3 |
| 8,736,515 B2 | 5/2014 | Yang et al. | |
| 2001/0002124 A1* | 5/2001 | Mamiya et al. | 345/132 |
| 2002/0118200 A1* | 8/2002 | Mukherjee et al. | 345/504 |
| 2010/0315427 A1* | 12/2010 | Wyatt et al. | 345/502 |
| 2014/0092150 A1* | 4/2014 | Slavenburg et al. | 345/698 |

FOREIGN PATENT DOCUMENTS

| | | |
|---|---|---|
| CN | 1436396 | 8/2003 |
| CN | 102262523 | 11/2011 |

* cited by examiner

*Primary Examiner* — Xiao Wu
*Assistant Examiner* — Steven Elbinger
(74) *Attorney, Agent, or Firm* — McClure, Qualey & Rodack, LLP (57) ABSTRACT

A video wall, having screens, cables, synchronization detection modules and a central control unit. The cables are operative to carry image data to be displayed on the screens. The synchronization detection modules are coupled between the screens and the cables for detection of a feature symbol. The central control unit collects detection results from the synchronization detection modules, and the detection results are utilized in the adjustment of the image data before cable transmission. In this manner, image display synchronization between the screens is achieved. The synchronization detection modules may be implemented as connectors, each having a first end connected to a screen and a second end connected to a cable.

14 Claims, 10 Drawing Sheets

VIDEO WALL

CROSS REFERENCE TO RELATED APPLICATIONS

This Application claims priority of Taiwan Patent Application No. 102112807, filed on Apr. 11, 2013, the entirety of which is incorporated by reference herein.

BACKGROUND OF THE INVENTION

1. Field of the Invention

The present invention relates to a video wall, and in particular, relates to image display synchronization between different screens of a video wall.

2. Description of the Related Art

A video wall typically consists of multiple screens. The screens may have different specifications, e.g., various resolutions or different sizes, or different image sources and so on. For synchronization between the screens, the difference between the cables (e.g., the different cable lengths or the cable diameters and so on) conveying image data to the screens should be considered. It is important to operate the different screens synchronously for smooth image display on a video wall.

BRIEF SUMMARY OF THE INVENTION

A video wall in accordance with an exemplary embodiment of the invention comprises a plurality of screens, a plurality of cables, a plurality of synchronization detection modules and a central control unit. The cables are operative to convey image data to the screens for image display. The synchronization detection modules are coupled between the screens and the cables for detection of a feature symbol. The detection results of the feature symbol are collected by the central control unit. Before being conveyed by the cables, the image data for the different screens are adjusted individually by the central control unit based on the collected detection results, for synchronous display between the different screens.

In an exemplary embodiment, the "page number" of each image frame is regarded as the feature symbol. Before being conveyed by the cables, the image data for the different screens are adjusted individually by the central control unit to skip a frame or to prolong the display of a particular frame, for page number alignment between the different screens.

In other exemplary embodiments, the feature symbol is detected from a vertical synchronization signal, a horizontal synchronization signal, a vertical data enable signal or a horizontal data enable signal, or, a starting pixel of an image frame is regarded as the feature symbol. Under the control of the central control unit, the image data for the different cables may be delayed individually before being conveyed by the cables. In this manner, more precise image display synchronization between the different screens is achieved.

In an exemplary embodiment, the central control unit performs precise image display synchronization after the page number alignment between the different screens.

In an exemplary embodiment, each synchronization detection module is fabricated into a connector, having one end connected to a screen and having another end connected to a cable.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description shows several exemplary embodiments which carry out the invention. This description is made for the purpose of illustrating the general principles of the invention and should not be taken in a limiting sense. The scope of the invention is best determined by reference to the appended claims.

Figure 1:
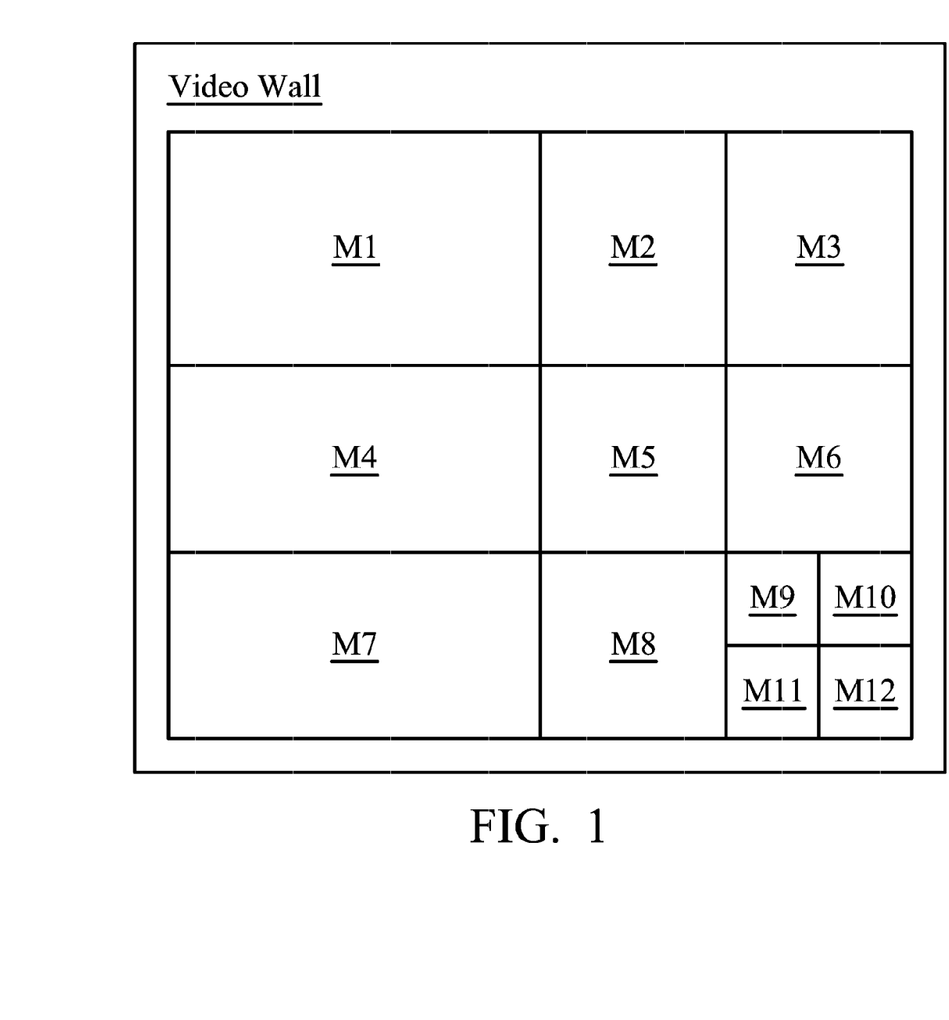
FIG. 1 depicts a video wall in accordance with an exemplary embodiment of the invention, consisting of a plurality of screens M1 to M12 to display a large image.

FIG. 1 depicts a video wall in accordance with an exemplary embodiment, which combines multiple screens M1 to M12 to display a large image. As shown, screens of a variety of sizes may be combined together. As shown, screen M1 is larger than screen M2, and screen M2 is larger than screen M9. In addition to the screen size, the resolutions, the image sources and so on may be different.

Figure 2:
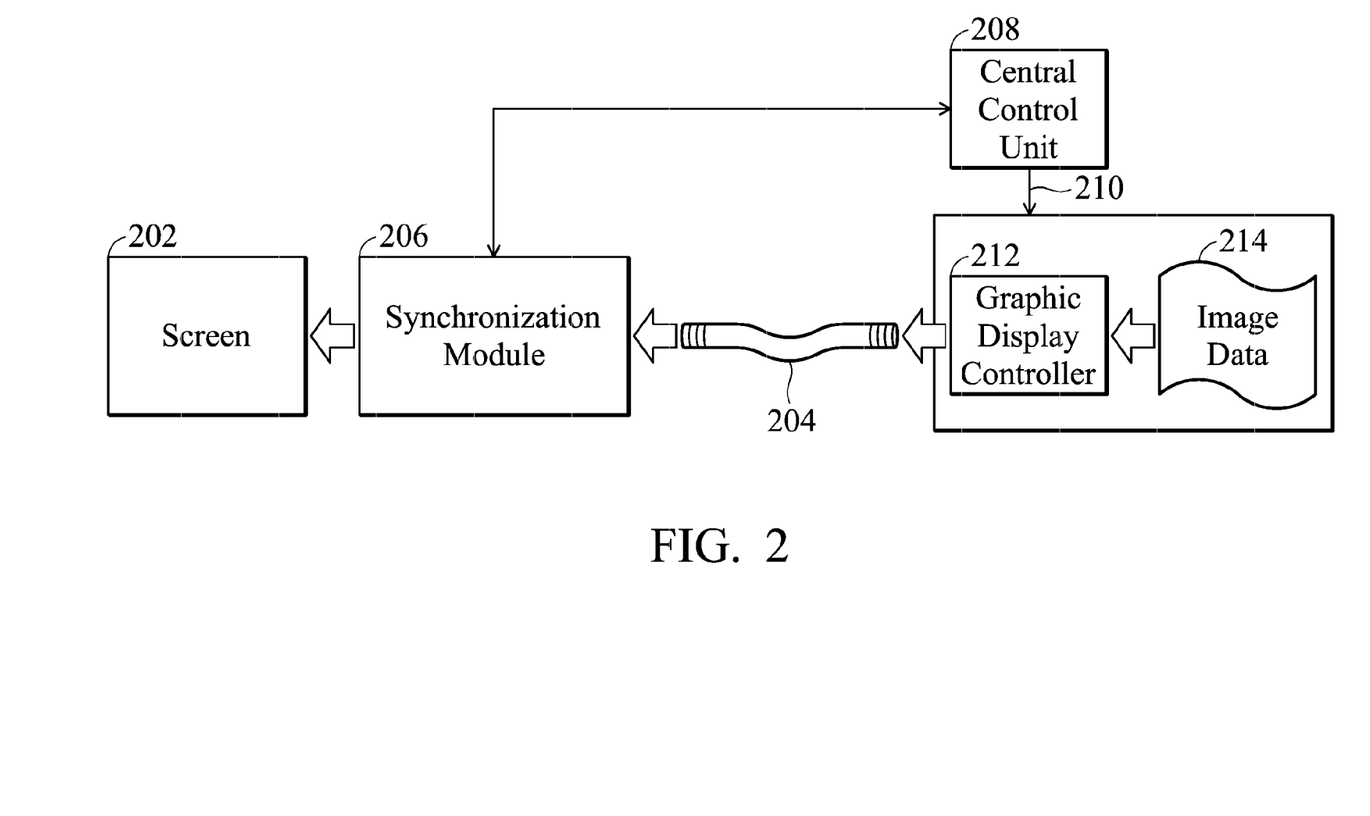
FIG. 2 shows how the image data is provided to a screen 202 of a video wall.

FIG. 2 shows how the image data is provided to a screen 202 of a video wall. For the screen 202, a cable 204 and a synchronization detection module 206 are provided in the design of the video wall. The image data is conveyed by the cable 204 to be displayed by the screen 202 (e.g., any of the screens M1 to M12 of the video wall of FIG. 1). The image data may come from a host, e.g., a computer, of the video wall. The synchronization detection module 206 is coupled between the cable 204 and the screen 202 to detect for a feature symbol. The detection result is transmitted from the synchronization detection module 206 to be collected by the central control unit 208. Note that the image data is adjusted by the central control unit 208, e.g., through the control path 210, prior to being transmitted to the cable 204 by the graphic display controller 212. The graphic display controller 212 may be implemented by a graphic processing unit.

A video wall with multiple screens is established based on that shown in FIG. 2, which includes a plurality of cables and a plurality of synchronization detection modules corresponding thereto. The detection results of the feature symbol detection performed by the different synchronization detection modules are collected and analyzed by the central control unit 208. Accordingly, the central control unit 208 estimates the time differences between the signals output from the different cables. Under the control of the central control unit 208, the image data for the different cables are individually adjusted before being conveyed by the cables and thereby estimated time differences are compensated for. In this manner, the different screens of the video wall display images synchronously.

In an exemplary embodiment, the image data adjustment is performed within the graphic display controller 212 coupled to the cable 204. With respect to that shown in FIG. 2, the control path 210 is designed for the control of the graphic display controller 212. The graphic display controller 212 is coupled to the cable 204. The image data output from the graphic display controller 212 is conveyed to the screen 202 by the cable 204. The graphic display controller 212 may retrieve a proper image area from an image source based on the location of the screen 202, and, the graphic display controller 212 may further resize the image to fit the size or resolution of the screen 202. An entire image, therefore, is formed by the plurality of screens M1 to M12. For image display between the screens M1 to M12 to be synchronous, the central control unit 208 controls the graphic display controllers individually through the control path 210, and thereby the graphic display controllers adjust their output delay amounts individually.

Figure 3A:
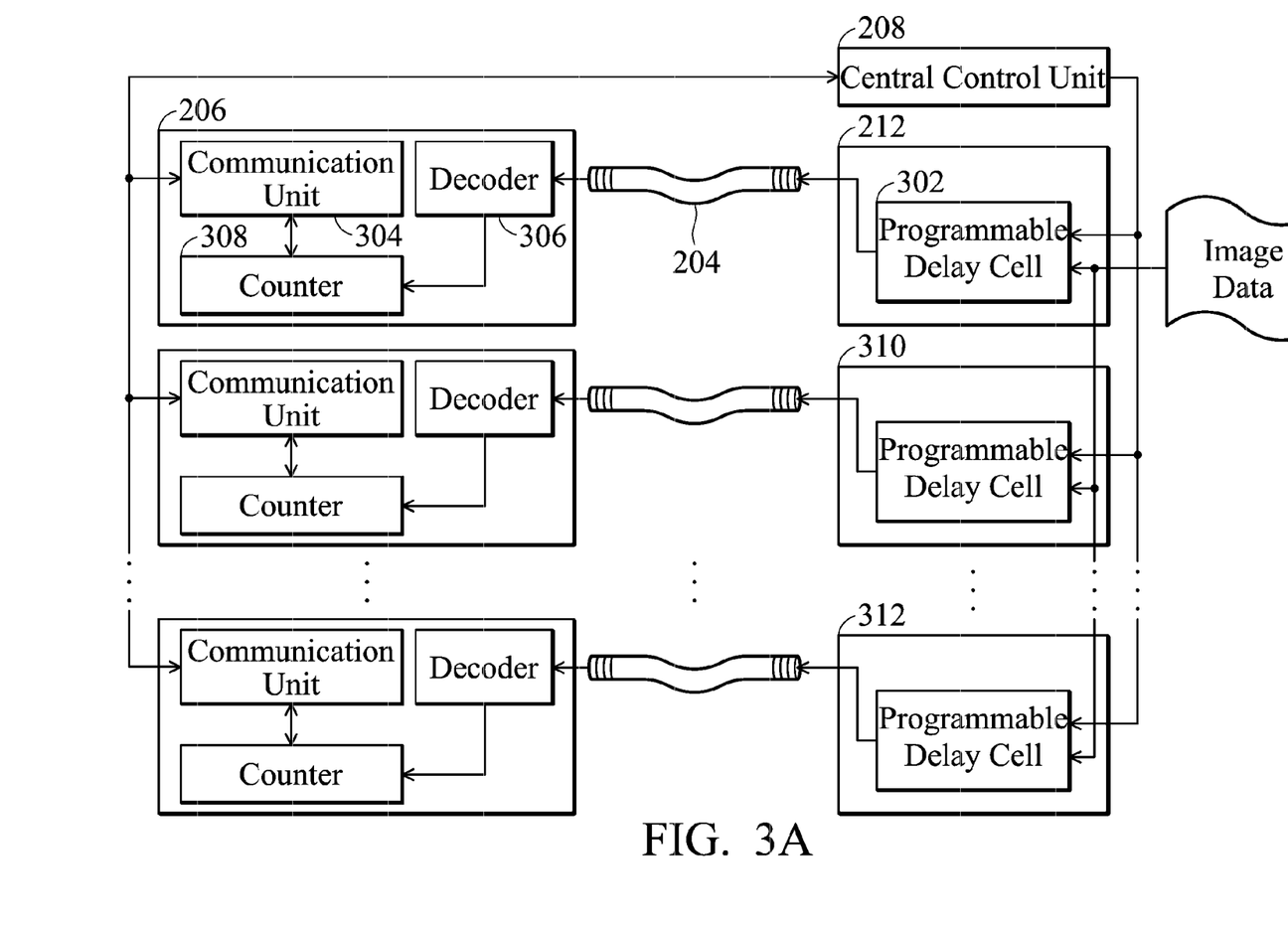
FIG. 3A shows an exemplary embodiment of the invention, in which multiple sets of graphic display controllers, cables and synchronization detection modules are controlled by the central control unit for image display synchronization between the different screens.

FIG. 3A depicts an exemplary embodiment of the invention, in which multiple sets of graphic display controllers, cables and synchronization detection modules are shown, controlled by a central control unit 208 for image display synchronization between the different screens. As shown in FIG. 3A, each graphic display controller, e.g. 212, comprises a programmable delay unit 302, by which the image data is delayed before being conveyed via the cable 204. Each synchronization detection module, e.g. 206, is coupled to a screen corresponding thereto (e.g., 202 of FIG. 2, not shown in FIG. 3). A synchronization detection module 206 includes a communication unit 304, a decoder 306 and a counter 308. The communication unit 308 communicates with the central control unit 208. The decoder 306 decodes the image data received from the cable 204, for detection of the feature symbol. According to the control of the central control unit 208 through the communication unit 206, the counter 308 starts counting until the decoder 306 obtains the feature symbol. Thus, the time the image data takes from being received by the graphic display controller 212 to being output from the cable is measured. Via the communication unit 304, the counting result of the counter 308 is transmitted to and collected by the central control unit 208. The central control unit 208 outputs a count start signal for all of the counters of the synchronization detection modules, to synchronously start the counters of the different synchronization detection modules. Because the counters start counting at the same time, the counting results reflect the time differences between the transmissions of the different cables. When receiving the feature symbol, a synchronization detection module outputs the counting result to the central control unit 208. According to the counting results from the different synchronization detection modules, the central control unit 208 controls the programmable delay cells, e.g. 302, of the different graphic display controllers individually, to compensate for the cable transmission time differences before cable transmission. Thus, the cables output signals at the same time, and thereby the different screens of the video wall synchronously display images. For example, a delay cell should be set to provide a longer delay time in response to a lower counting value, and should be set to provide a shorter delay time in response to a greater counting value. A programmable delay cell may delay the signal based on a delay amount written in a register or a non-volatile memory (e.g. a FLASH memory). The delay amounts to be filled into the registers or the non-volatile memories of the programmable delay cells of the different graphic display controllers are decided by the central control unit 208. The communication between the communication unit 304 and the central control unit 208 and the communication between the central control unit 208 and the programmable delay cell 302 may be by wired communication or wireless communication. The wireless communication (e.g. Wi-Fi) is preferred, to avoid delays due to the wired communication between the communication unit 304 and the central control unit 208 or the wired communication between the central control unit 208 and the programmable delay cell 302. The measurement and compensation for the transmission time differences may be performed during startup of the video wall, or may be performed periodically during the operation of the video wall.

As shown in the exemplary embodiment of the FIG. 3A, the different graphic display modules may be connected in series. The image data received by the graphic display controller 212 is further output by the graphic display controller 212 to be received by the graphic display controller 310 at a next stage. Similarly, the image data is coupled stage by stage all the way to the last graphic display controller 312. Note that the image data is output by the graphic display controller 212 to be received by the graphic display controller 310 before being processed by the programmable delay cell 302. Connecting the graphic display controllers in series in the embodiment, is not limiting. In another exemplary embodiment, the different graphic display controllers are connected in parallel rather that in series. An image data is provided to all of the different graphic display controllers in parallel. In another exemplary embodiment, referring to FIG. 3B, the different graphic display controllers (including 212, 314 and 316) have their own image data sources. The image data received by the different graphic display controllers may be identical or distinct. In other exemplary embodiments, the different graphic display controllers may be arranged in a combination of series and parallel connections. For example, some graphic display controllers are connected in series before being connected in parallel with the remaining graphic display controllers, or vice versa.

The various exemplary embodiments of the feature symbol are discussed in this paragraph. FIG. 3C shows how an image frame output from the decoder 306 is interpreted in accordance with the related signals. The vertical synchronization signal V_sync defines the start of the image frame. The horizontal synchronization signal H_sync defines the start of each scan line. In the vertical direction, the image frame is divided into a vertical active area V_active and a vertical blank area V_blank. The vertical active area V_active includes the lines containing real image content. The vertical blank area V_blank does not contain any real image content. In the horizontal direction, a scan line of the image frame is divided into a horizontal active area H_active and a horizontal blank area H_blank. The horizontal active area H_active includes real image pixels. The horizontal blank area H_blank does not contain any real image content. In other words, the real image content should be decoded from the horizontal active area H_active of the vertical active area V_active. A vertical data enable signal V_DE and a horizontal data enable signal H_DE are provided to indicate the vertical active area V_active and the horizontal active area H_active, respectively. Any variation of any of the vertical synchronization signal V_sync, horizontal synchronization signal H_sync, vertical data enable signal V_DE and horizontal data enable signal H_DE may be regarded as the feature symbol. In another exemplary embodiment, the feature symbol may be the starting pixel of the image frame (i.e., apart from the vertical blank area V_blank and the horizontal blank area H_blank, and the first pixel data containing real image content in the image frame.) The central control unit 208 collects and analyzes the detection results of the feature symbol to estimate the timing differences at the output terminals of the cables and then adjusts the image data for the different cables individually before cable transmission. Thus, timing differences are compensated for.

In another exemplary embodiment, the feature symbol to be detected is a test pulse, output prior to image data, for transmission time measurement of the cable. In such an exemplary embodiment, the decoder 306 of the synchronization detection module is not necessary. Via the communication unit 304, the central control unit 208 may inform the synchronization detection module 206 of the output timing of the test pulse, to start the counter of the synchronization detection module. The counter stops counting when the test pulse is received by the synchronization detection module 206. The counting value output from the counter is sent back to the central control unit 208.

Figure 3B:
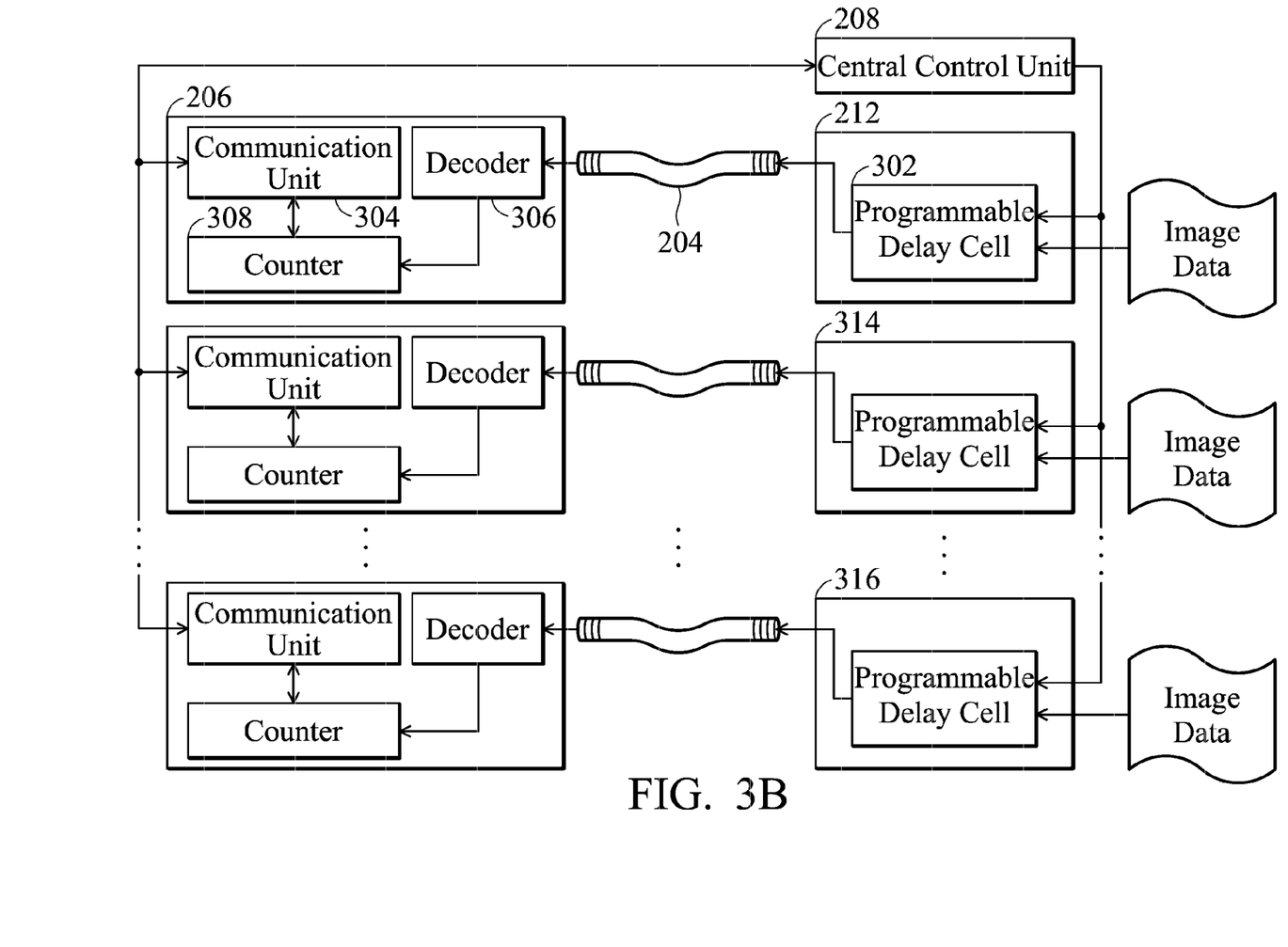
FIG. 3B shows another exemplary embodiment of the invention, wherein the graphic display controllers 212, 314, 316 receive images independently.
Figure 3C:
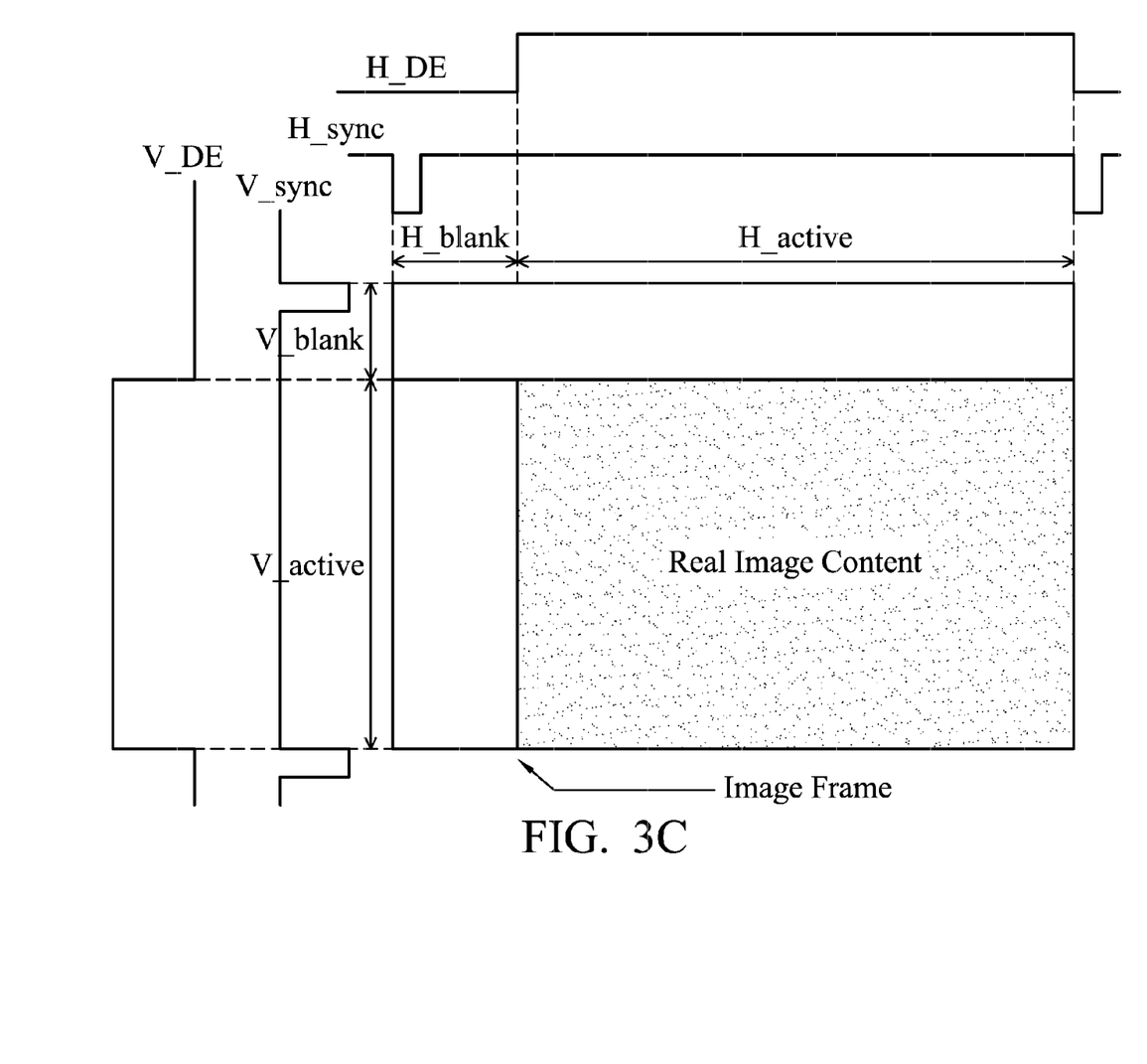
FIG. 3C shows how an image frame output from the decoder 306 is interpreted in accordance with the related signals.
Figure 4:
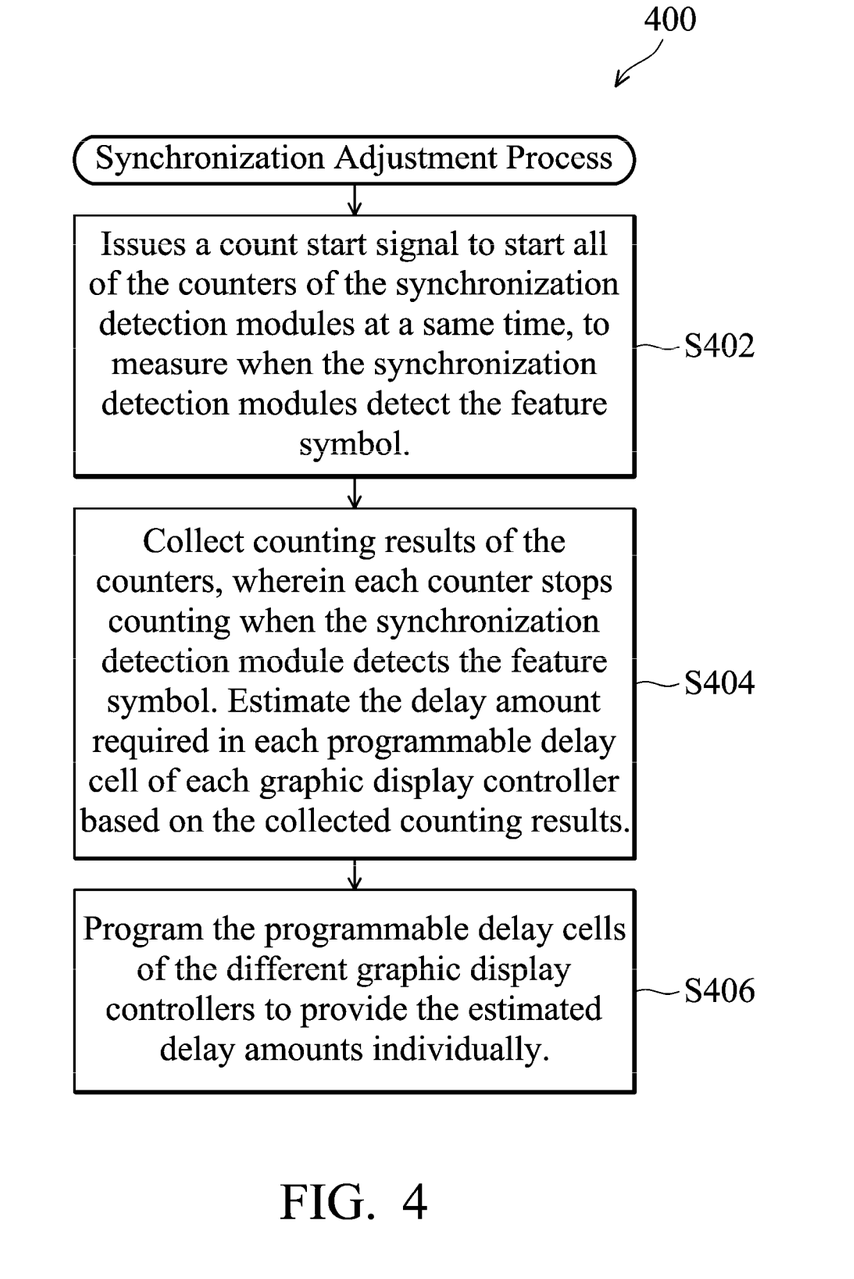
FIG. 4 is a flowchart showing a synchronization adjustment process 400 in accordance with an exemplary embodiment of the invention, which may be performed by the central control unit 208 to operate the structures shown in FIGS. 3A and 3B.

FIG. 4 is a flowchart showing a synchronization adjustment process 400 in accordance with an exemplary embodiment of the invention, which may be performed by the central control unit 208 to operate the structures shown in FIGS. 3A and 3B. In step S402, the central control unit 208 issues a count start signal to start all of the counters of the synchronization detection modules at a same time, to measure when the synchronization detection modules detect the feature symbol. In step S404, each synchronization detection module transmits a counting value, provided by the counter therein, to the central control unit 208 when detecting the feature symbol, and, based on the counting values from the counters, the central control unit 208 estimates the delay amount required in each programmable delay cell of each graphic display controller. In step S406, the central control unit 208 programs the programmable delay cells of the different graphic display controllers to provide the estimated delay amounts individually.

In another exemplary embodiment, the image data for each cable is adjusted individually before being input to the graphic display controller. Referring back to FIG. 2, the control path 210 is established to adjust the image data 214 before the image data is transmitted into the graphic display controller 212, which is discussed in the following paragraph.

Figure 5:
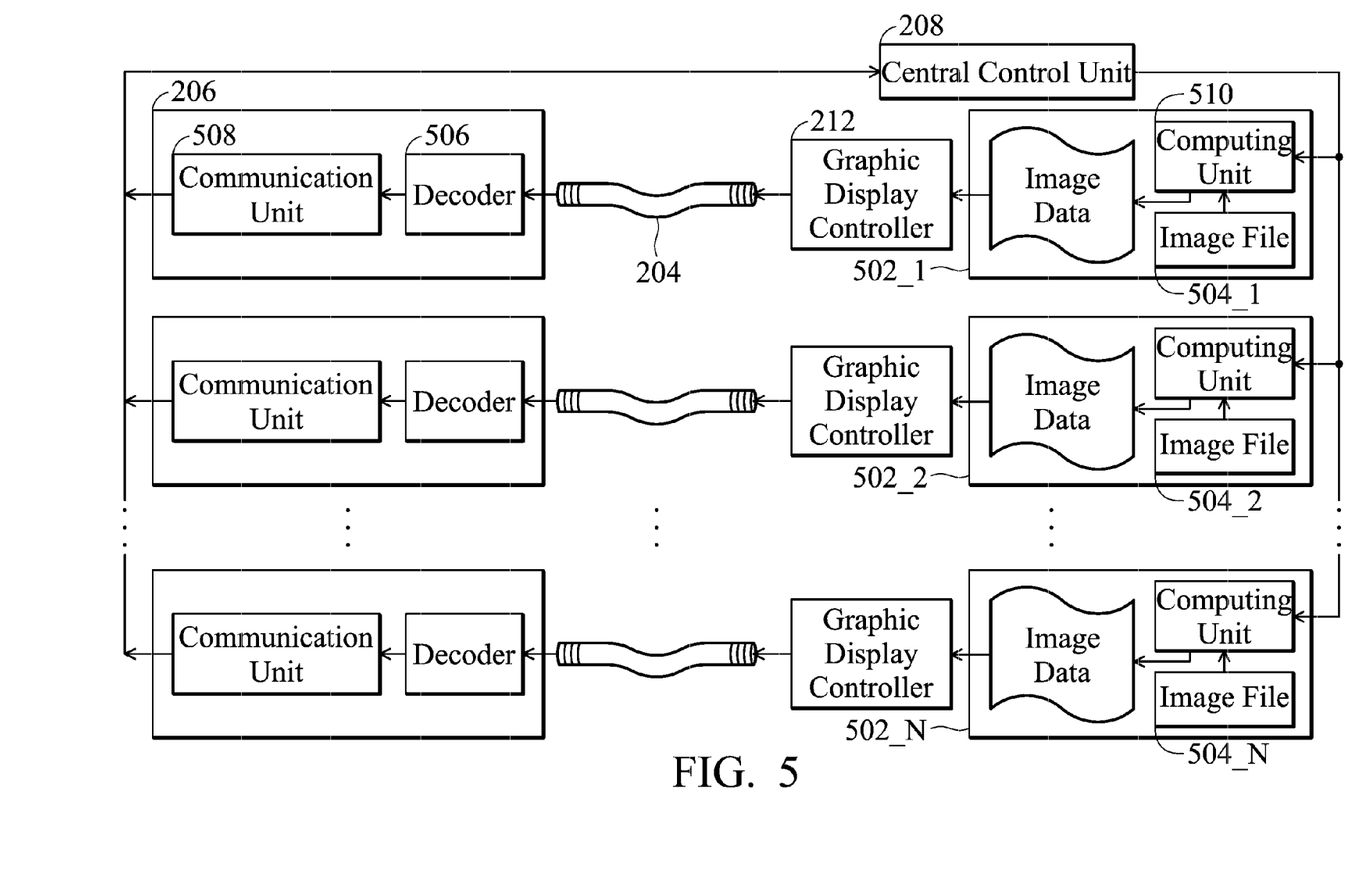
FIG. 5 shows another exemplary embodiment of the invention which is operated by multiple hosts, wherein the multiple hosts provide image data for the different screens, and, the image data for the different screens are individually adjusted in the different hosts before being transmitted to the different graphic display controllers.

FIG. 5 shows another exemplary embodiment of the invention which is operated by multiple hosts, wherein the multiple hosts provide image data for the different screens, and, the image data for the different screens are adjusted in the different hosts individually before being transmitted to the different graphic display controllers. The images processed in the different hosts may be identical or distinct. Corresponding to the different cables, the multiple hosts 502_1, 502_2 to 502_N for the disclosed video wall provide image data based on their dedicated files 504_1, 504_2 to 504_N, respectively. In the files 504_1, 504_2 to 504_N introduced in this exemplary embodiment, a "page number" is encoded in the blank area (i.e. defined by V_blank and H_blank of FIG. 3C) of each image frame. The synchronization detection module (e.g. 206) includes a decoder 506 and a communication unit 508. The decoder 506 decodes the page number from the image frame transmitted from the cable 204, and, the page number obtained by the decoder 506 is transmitted by the communication unit 508 to the central control unit 208 and is collected by the central control unit 208. Based on the collected page numbers from the different synchronization detection modules, the central control unit 208 operates the plurality of hosts 502_1, 502_2 to 502_N individually to skip frames or to prolong the display of a particular frame, and thereby maintain the screens to be of a same page number. The host, e.g. 502_1, is coupled to a graphic display controller 212 and comprises a computing unit 510. The image adjustment to achieve identical page numbers may be performed within each computing unit, e.g. 510, which is controlled by the central control unit 208 for skipping frames or for prolonging the display of a particular frame and so on. The image data which has been adjusted by the computing unit 510 is transmitted to the graphic display controller 212. The graphic display controller 212 may retrieve a proper image area from the received image data based on the location of the screen corresponding thereto, and, the graphic display controller 212 may further resize the retrieved image area to fit the size or resolution of the screen. The graphic display controller 212 may further couple the retrieved image area data to the cable 204 for transmission. By the architecture of FIG. 5, the page number mismatch due to the mismatched clocks between the different hosts and the timing differences between the cable transmissions do not occur. The page number alignment may be executed periodically during the image display. The page number inconsistency, therefore, is timely corrected. For example, when the page numbers decoded by three different decoders are 0005, 0007 and 0008, the image source corresponding to the first decoder (obtaining a page number 0005) may be controlled to drop 3 frames and the image source corresponding to the second decoder (obtaining a page number 0007) may be controlled to drop 1 frame, or, the image source corresponding to the second decoder (obtaining a page number 0007) may be controlled to prolong the display of the current frame for 2 frame periods and the image source corresponding to the third decoder (obtaining a page number 0005) may be controlled to prolong the display of the current frame for 3 frame periods.

Figure 6:
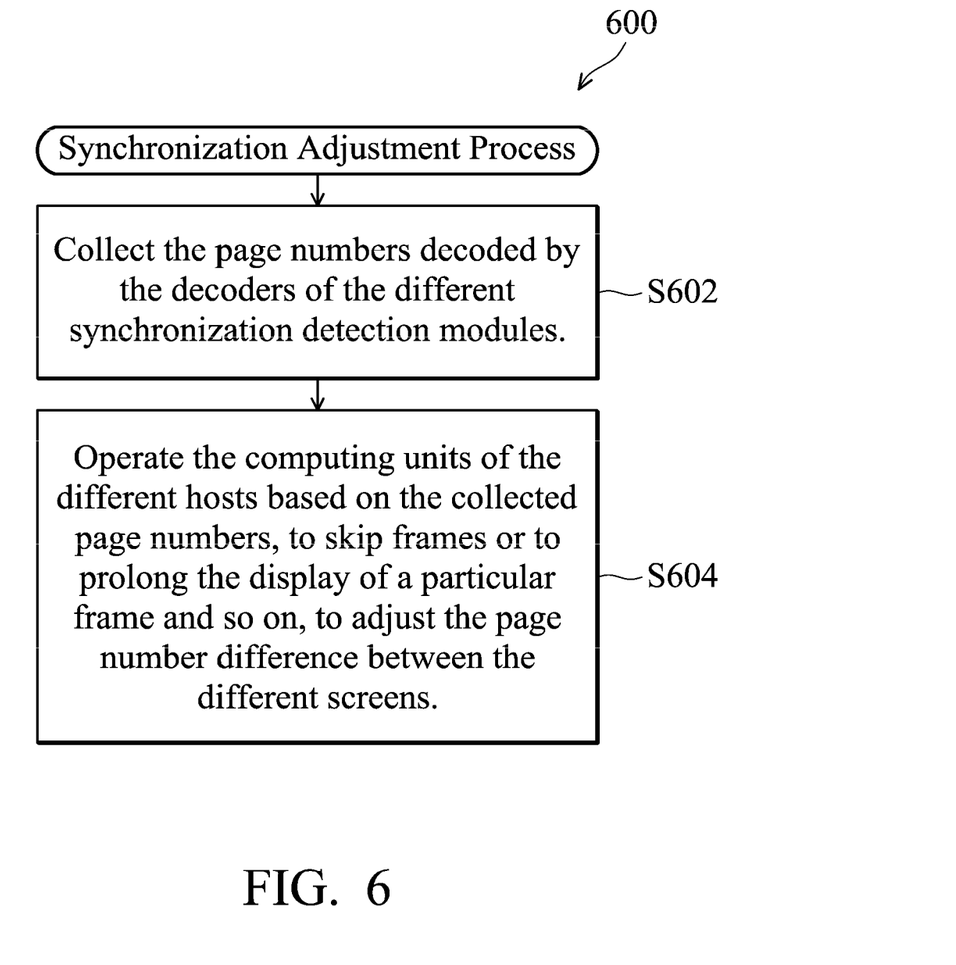
FIG. 6 is a flowchart depicting a synchronization adjustment process 600 in accordance with an exemplary embodiment of the invention, which may be performed by the central control unit 208 to operate the structure shown in FIG. 5.

FIG. 6 is a flowchart depicting a synchronization adjustment process 600 in accordance with an exemplary embodiment of the invention, which may be performed by the central control unit 208 to operate the structure shown in FIG. 5. In step S602, the page numbers decoded by the decoders of the different synchronization detection modules are collected by the central control unit 208. In step S604, based on the differences between the collected page numbers, the central control unit 208 operates the computing units of the plurality of hosts 502_1, 502_2 . . . 502_N to skip frames or to prolong the display of a particular frame and so on, to adjust the page number difference between the different screens.

Figure 7:
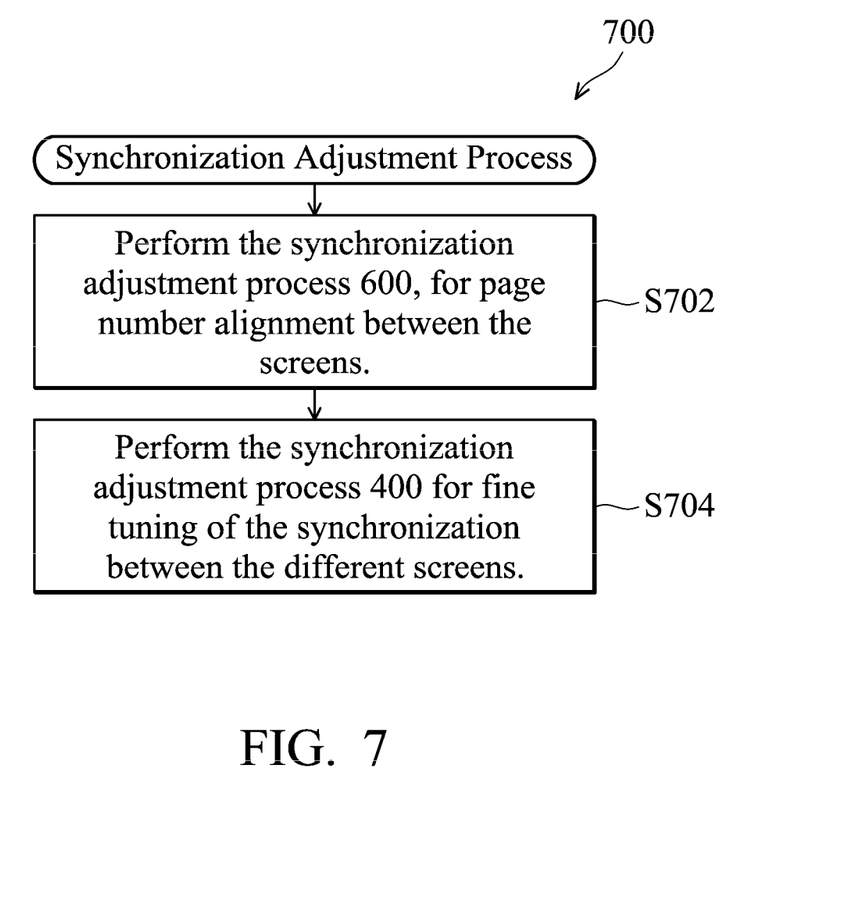
FIG. 7 shows a synchronization adjustment process 700 which may be performed by the central control unit 208.

The aforementioned synchronization adjustment techniques may be combined. FIG. 7 shows a synchronization adjustment process 700 which may be performed by the central control unit 208. In step S702, the process 600 is performed for the screens controlled by the different hosts of the video wall, for page number alignment therebetween. In step S704, the process 400 is performed for fine tuning of the synchronization between the different screens controlled by a same host. The hardware design is based on the architectures shown in FIGS. 3A, 3B and FIG. 5.

The synchronization detection module 206 may be fabricated into a connector, having a first end connected to a screen 202 and having a second end connected to a cable 204. The communication unit 304 of the synchronization detection module 206 may be implemented according to a wireless communication protocol, to wirelessly communicate with the central control unit 208. The synchronization detection module 206 and the graphic display controller 212 are designed to comply with the size and the resolution of the screen 202.

Figure 8:
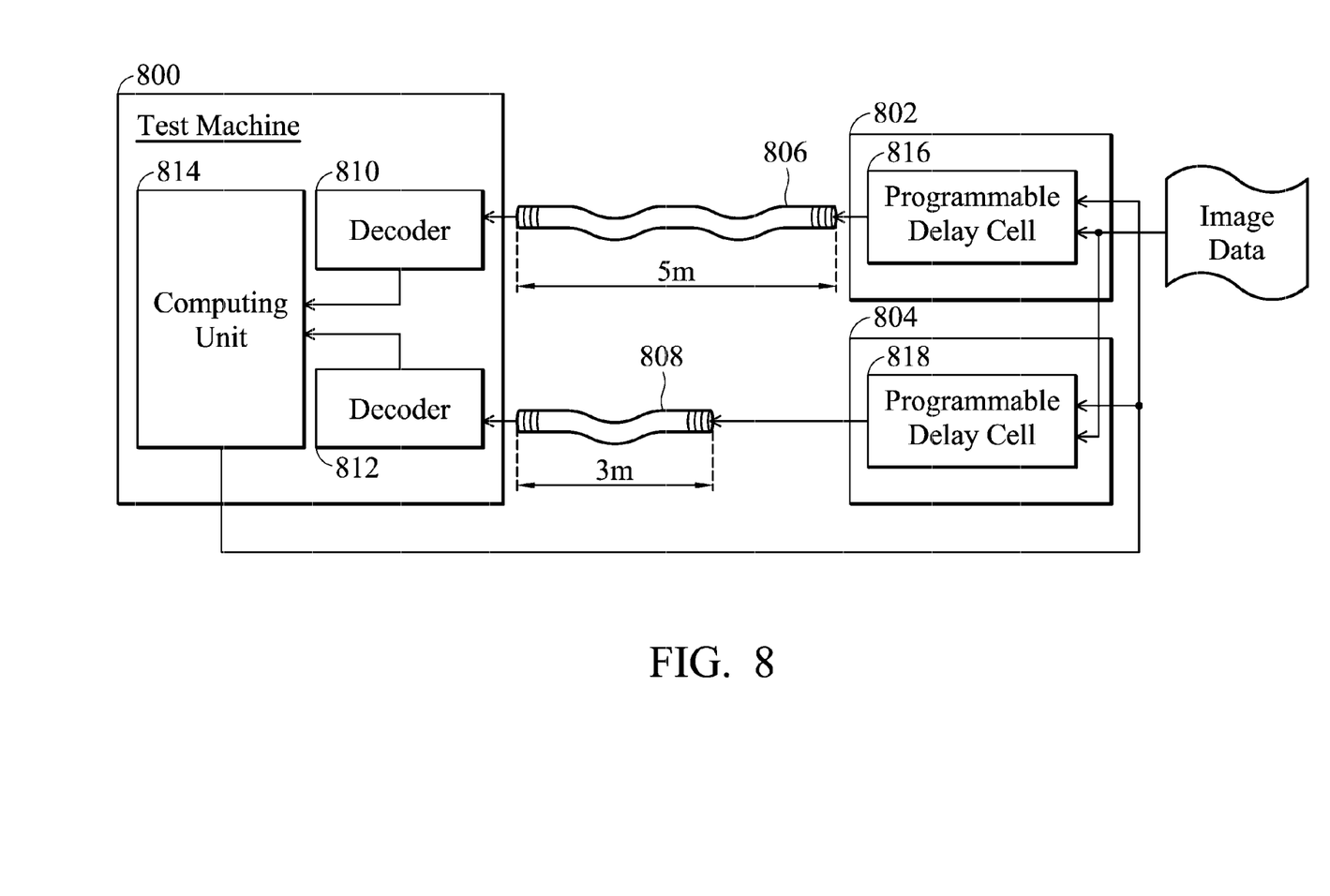
FIG. 8 shows the preliminary adjustment for the programmable delay units of the disclosed graphic display controllers, which may be performed in a laboratory.

In an exemplary embodiment, the programmable delay cells (e.g. 302) of the graphic display controllers of the disclosure may be coarsely set in the lab before being assembled with the screens to form a video wall. FIG. 8 shows the lab environment for preliminary setting of the programmable delay cells. A vendor may offer a test machine 800 to be connected with a graphic display controller 802 and a graphic display controller 804 via a cable 806 and a cable 808. The cables 806 and 808 are the same as those actually equipped in the video wall. For example, when the graphic display controller 802 is designed to be coupled to a screen by a 5 meters long cable, the cable 806 tested in the lab is 5 meters. When the graphic display controller 804 is designed to be coupled to a screen by a 3 meters long cable, the cable 808 tested in the lab is 3 meters. The connection between the graphic display controllers 802 and 804 should be the same as that in video wall. In FIG. 8, the graphic display controllers 802 and 804 are connected in series similar to that of FIG. 3A.

The test machine 800 includes decoders 810 and 812 and a computing unit 814. The decoders 810 and 812 may be designed based on the decoder 306 of FIG. 3A. According to the time difference for obtaining the feature symbol by the decoders 810 and 812, the computing unit 814 sets the delay amounts of the programmable delay cells 816 and 818.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A video wall, comprising:
  a plurality of screens;
  a plurality of cables for image data transmission and a plurality of synchronization detection modules, wherein the synchronization detection modules are coupled between the screens and the cables for detection of a feature symbol;
  a central control unit, collecting detection results of the feature symbol and adjusting image data based on the detection results before the image data are provided to the cables, for image display synchronization between the screens; and
  a plurality of graphic display controllers, coupled to the cables to provide the cables with the image data based on the arrangement of the screens in the video wall, wherein:
  each graphic display controller comprises a programmable delay cell, and each programmable delay cell is set by the central control unit to delay the image data corresponding thereto by a delay amount before providing the image data to the cable corresponding thereto;
  each synchronization detection module comprises:
  a communication unit, for communication with the central control unit; and
  a counter, controlled by the central control unit via the communication unit to start counting, wherein the counter stops counting when the feature symbol is detected, and, a counting result of the counter is transmitted to the central control unit via the communication unit to be collected by the central control unit; and
  the central control unit transmits a count start signal to be received by the communication units of all the synchronization detection modules and thereby the counters of all the synchronization detection modules start counting simultaneously; and
  the central control unit sets the programmable delay cells of all graphic display controllers individually based on the collected counting results.

2. The video wall as claimed in claim 1, wherein:
  each synchronization detection module further comprises:
  a decoder, decoding the image data received from the cable to obtain the feature signal from the image data to stop the counter.

3. The video wall as claimed in claim 2, wherein the feature symbol is contained in a vertical synchronization signal, a horizontal synchronization signal, a vertical data enable signal, or a horizontal data enable signal, or, the feature symbol is a starting pixel of an image frame.

4. The video wall as claimed in claim 1, wherein the feature symbol is a test pulse.

5. The video wall as claimed in claim 1, wherein the central control unit controls the programmable delay cells by wireless communication.

6. The video wall as claimed in claim 1, wherein:
  a the decoder further decodes the image data received from the cable to obtain a page number; and
  the communication unit transmits the decoded page number to the central control unit to be collected by the central control unit.

7. The video wall as claimed in claim 6, further comprising:
  a plurality of hosts each corresponding to an exclusive image file, wherein:
  the plurality of hosts are coupled to the cables and thereby the image data provided to each cable is based on the exclusive image file of the plurality of hosts corresponding thereto; and
  the plurality of hosts are individually controlled by the central control unit based on the page numbers collected by the central control unit, to skip frames or to prolong the display of a particular frame for page number alignment on the screens.

8. The video wall as claimed in claim 7, wherein each host comprises:
  a computing unit, controlled by the central control unit to skip frames or to prolong the display of a particular frame.

9. The video wall as claimed in claim 8, wherein:
  the plurality of graphic display controllers receive image data processed by the computing units.

10. The video wall as claimed in claim 9, wherein the central control unit controls the programmable delay cells by wireless communication.

11. The video wall as claimed in claim 9, wherein:
  the counter stops counting when the decoder decodes feature symbol from a vertical synchronization signal, horizontal synchronization signal, vertical data enable signal or horizontal data enable signal or when the decoder obtains a starting pixel of an image frame; and after ensuring that the screens are on identical page numbers, the central control unit transmits the count start signal to be received by the communication units of all the synchronization detection modules.

12. The video wall as claimed in claim 9, wherein:

the counter stops counting when a test pulse is output from the cable; and after ensuring that the screens are on identical page numbers, the central control unit transmits the count start signal to be received by the communication units of all the synchronization detection modules.

13. The video wall as claimed in claim 1, wherein the synchronization detection module is fabricated into a connector having one end for screen connection and another end for cable connection.

14. The video wall as claimed in claim 1, wherein the synchronization detection module communicates with the central control unit by wireless communication.

* * * * *